United States Patent [19]

Lührig et al.

[11] 4,395,107
[45] Jul. 26, 1983

[54] FILM CASSETTE

[75] Inventors: Hermann Lührig, Leverkusen; Franz Hoffacker, Langenfeld; Guido Kovacic, Unkel; Dieter Engelsmann, Unterhaching; Siegfried Zobel, Munich; Hubert Hackenberg, Holzkirchen; Karl Wagner, Munich, all of Fed. Rep. of Germany

[73] Assignee: Agfa-Gevaert AG, Leverkusen, Fed. Rep. of Germany

[21] Appl. No.: 264,668

[22] Filed: May 15, 1981

[30] Foreign Application Priority Data

May 22, 1980 [DE] Fed. Rep. of Germany ....... 3019664

[51] Int. Cl.³ .................. G03B 17/26; G03B 1/04
[52] U.S. Cl. .................. 354/275; 242/71.1
[58] Field of Search .............. 242/71.1, 71.7; 354/275, 276, 277

[56] References Cited

U.S. PATENT DOCUMENTS

| 2,176,507 | 10/1939 | Nagel | 242/71.1 X |
| 2,521,956 | 9/1950 | Wallace et al. | 242/71.1 X |
| 2,662,696 | 12/1953 | Nerwin | 242/71.1 |
| 2,894,141 | 7/1959 | Kollock | 354/277 X |
| 3,690,582 | 9/1972 | Duvall | 242/71.1 |
| 3,722,387 | 3/1973 | Walther | 354/275 |
| 4,176,938 | 12/1979 | Weiss et al. | 354/275 |

FOREIGN PATENT DOCUMENTS 2803758 8/1979 Fed. Rep. of Germany ...... 354/275

Primary Examiner—Donald A. Griffin
Attorney, Agent, or Firm—Michael J. Striker

[57] ABSTRACT

A film cassette for multi-exposure film strips has a body part with an inner compartment for a film strip and at least one opening for passage of the film strip therethrough between an initial position before exposure and a final position after exposure, and elements for preventing unintentional withdrawal of the film strip from the body part in at least one of these positions, the preventing elements arranged between the body part and the film strip. The preventing elements can be arranged so that they prevent unintentional withdrawal of the film strip in both positions. The preventing elements include a recess provided in one of the film strip and the body part, and a projection provided in the other of the film strip and the body part and engageable in the recess.

35 Claims, 20 Drawing Figures

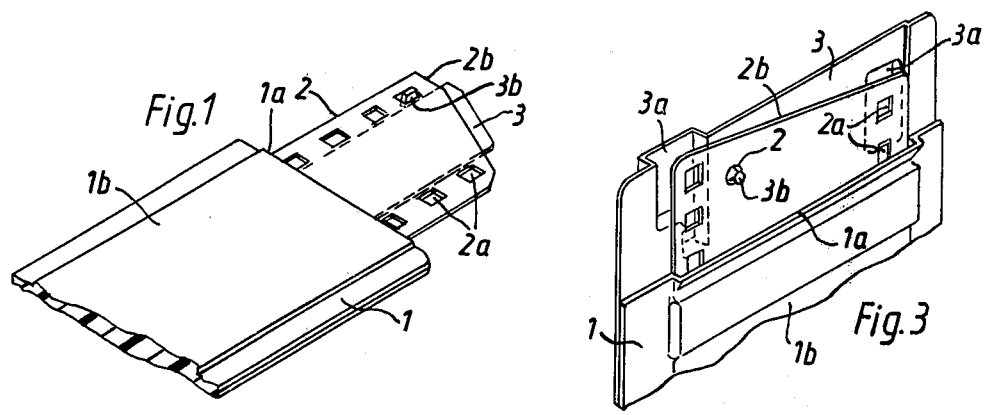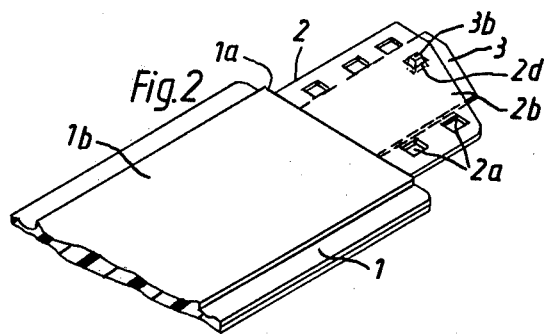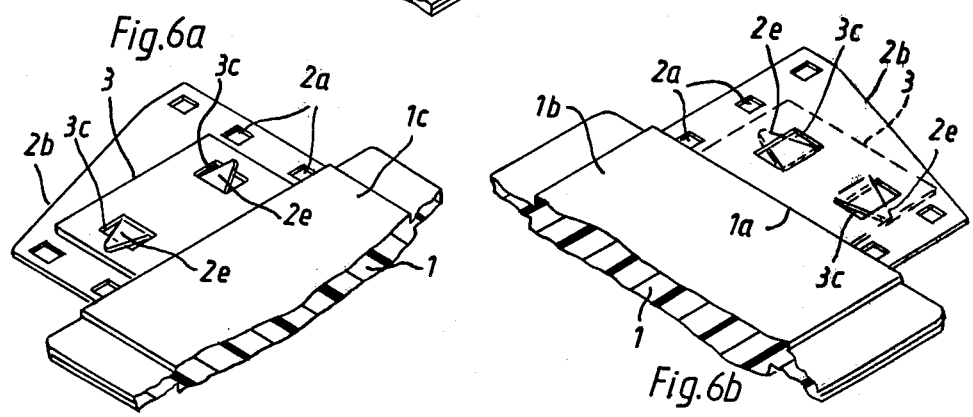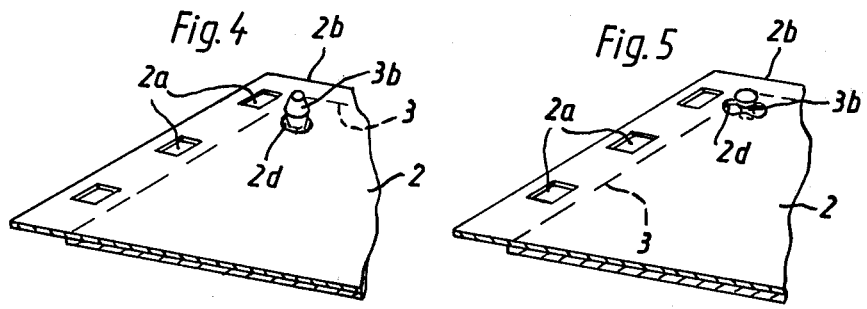

FILM CASSETTE

BACKGROUND OF THE INVENTION

The present invention relates to a film cassette, and more particularly to a film cassette which is suitable for receiving a multi-exposure film strip.

Film cassettes of the above-mentioned general type are known in the art. A known film cassette has a light-impermeable body part formed as a pocket or a roll with an opening extending normal to the elongation of the pocket or to the cylindrical surface of the roll. The known cassettes are provided with caps or adhesive strips extending over the opening and arranged for protection of the film strip from unintentional extraction or dropping out of the cassette having broken sections serving simultaneously as indicating means for the exposed film located in the body part. Before the exposure sections of the caps or adhesive strips must be broken and thereby serve as indicating means for the exposed film in the cassette. These caps or adhesive strips have the disadvantage in the fact that they must be broken either by hand or an associated camera must be provided with means for removing and in some cases closing the caps.

SUMMARY OF THE INVENTION

Accordingly, it is an object of the present invention to provide a film cassette which avoids the disadvantages of the prior art.

More particularly, it is an object of the present invention to provide a film cassette in which a film strip cannot be unintentionally withdrawn from the cassette.

In keeping with these objects, and with others which will become apparent hereinafter, one feature of the present invention resides, briefly stated, in a film cassette for multi-exposure film strips, which has a body part with an inner compartment for a film strip and at least one opening for passage of the film strip therethrough between an initial position before exposure and a final position after exposure, wherein means is provided for preventing unintentional withdrawal of the film strip from the body part of the cassette in at least one of the above-mentioned positions, which means is arranged between the body part and the film strip.

In accordance with another advantageous feature of the invention, the preventing means are arranged so that they prevent unintentional withdrawal of the film strip in each of the above-mentioned positions. The preventing means may be formed as interengaging projection and recess provided in one of the film strip and the body part of the cassette.

The novel features which are considered characteristic for the invention are set forth in particular in the appended claims. The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

FIGS. 1-5 are views showing a film cassette in accordance with one embodiment of the present invention, wherein meeans for preventing unintentional withdrawal of a film strip from the film cassette is arranged in the region of a leading end of the film strip;

FIGS. 6a and 6b are views showing the film cassette in accordance with another embodiment of the present invention;

DESCRIPTION OF THE PREFERRED EMBODIMENTS

Figure 7A:
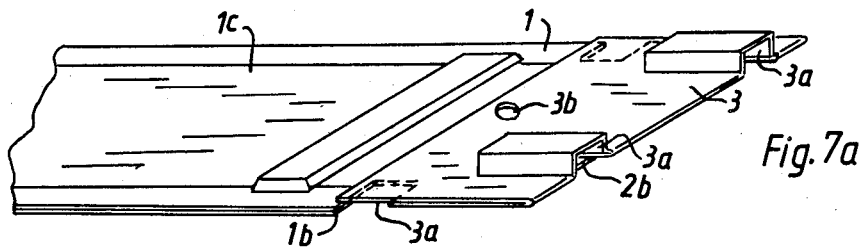
FIGS. 7a and 7b are views showing the film cassette in accordance with still another embodiment of the present invention.

A film cassette in accordance with the present invention shown in FIGS. 1–13b has a body part which is formed as a flat pocket and identified by reference numeral 1. It is suitable for receiving a multi-exposure film strip which is identified by reference numeral 2 and has perforations 2a, a leading end 2b and a trailing end 2c. The body part 1 of the cassette has a mouth or an opening for passage of the film strip 2 therethrough out of and back into the body part or pocket 1, which is identified by reference numeral 1a. The pocket 1 can be composed of rigid but somewhat flexible foil material, such as metal, synthetic plastic material or thin cardboard. Advantageously, this material is somewhat deformable so that it can be stamped to provide, for example, corrugations or projections. The pocket 1 has two flat walls 1b and 1c, of which the wall facing towards the emulsion side of the film is identified by reference numeral 1b and the wall facing away from the same is identified by reference numeral 1c.

The cassettes shown in FIGS. 1-7 has a supporting tongue 3 provided on the wall 1c facing away from the emulsion side of the film strip 2 and extending over the opening 1a. The supporting tongue 3 of the cassettes shown in FIGS. 1, 2 and 4-6 is substantially smaller than the leading end 2b of the film strip 2, so that the perforations 2a of the leading end 2b extending outwardly beyond the opening 1a are available for engagement by a film-transporting element of a camera. The supporting tongue 3 of the film cassette of FIG. 3 extends over the entire width of the cassette, but has depressions 3a in the region of the perforations 2a, at least one of the depressions extending to the end side of the supporting tongue 3. The depressions 3a allow engagement of a film-transport device of the camera into the perforations 2a and engagement of a disconnecting pin of the camera into the depressions open at the end side. The supporting tongue 3 of the cassette shown in FIGS. 7a and 7b extends substantially over the entire width of the cassette, but is connected or articulated with the pocket 1 along the longitudinal side thereof. Thereby, a slot is available between the wall 1c of the pocket 1 and the supporting tongue 3, and the supporting tongue 3 can spring about the longitudinal edge of the pocket 1.

Despite the fact that the cassette of the above-described type has light-sealing means in the region of the opening 1a, there is a danger that the leading end 2b extending outwardly of the opening 1a starts to slide out of the cassette in the event of awkward handling or dropping of the latter and thereby the film strip will be unintentionally and indefinitely exposed. Because of this, means for preventing unintentional withdrawal of the film strip 2 out of the cassette is provided. In accordance with the embodiment shown in FIGS. 1–6, the preventing means includes a projection 3b provided on the supporting tongue 3, and a recess 2d formed in the leading end 2b of the film strip so that the projection 3b can engage in the recess 2d. The projection 3b shown in FIG. 1 is formed by an inclined lug which is arranged at the end of the supporting tongue 3 and engages in the perforation 2a.

The projection 3b shown in FIGS. 2–5 are formed as an arresting button extending towards the film strip 2 and engaging in the complementary recess 2d in the leading end 2b of the film strip. The shape of the button 3b and of the recess 2d can be different, as shown in the drawings, so as to provide for different possibilities. The button 3b of FIG. 2 is shaped as a small truncated pyramid, whereas the associated recess 2d is square. The button 3b of FIG. 3 is shaped as a small cylinder, whereas the associated recess 2d is circular and has a diameter which is equal to or somewhat smaller than the diameter of the cylinder. The button 3b of FIG. 4 is shaped as a truncated double cone with the greatest diameter in its center, whereas the associated recess 2d is circular and has a diameter which is insignificantly smaller than the greatest diameter of the button 3b. Thereby a pushbutton-type arresting connection is provided whereas the previously described connections only resemble pushbutton-type connections. The connection shown in FIG. 5 is also of a pushbutton type. In this connection the button 3b is mushroom-shaped and the recess 2d is eight-shaped, whereas the smallest distance between the opposite points of the edge of the recess 2d is smaller than the greatest diameter of the mushroom-shaped button.

When the cassette shown in FIGS. 1–5 is inserted into an associated camera, an element provided in the camera presses the leading end 2b of the film strip 2 and the supporting tongue 3 from one another, and thereby disconnects the button 3b from the recess 2d. When after the exposure the film strip 2 is displaced back into the pocket 1 to a position shown in the drawings, the projection 3b and the recess 2d are brought again into engagement by hand or by an additional element provided in the camera, such as for example an element which is controlled by a back cover. Thereby, the film strip 2 is secured against withdrawal out of the cassette 1 before and after the exposure.

Figure 7B:
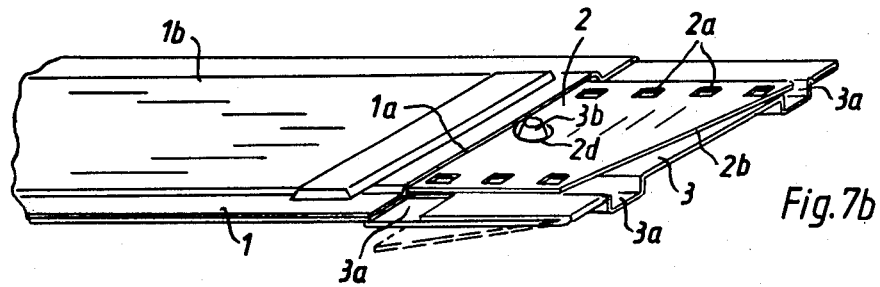

In the cassettes shown in FIGS. 1–5, the projection 3b and the recess 2d are arranged near the end edge of the leading end 2b. In contrast, the recess 2d and projection 3b of the cassette shown in FIGS. 7a and 7b are arranged substantially in the center of the width of the film strip and near the opening 1a, whereas the projection or button 3b has a height which is at least equal to the height of the opening 1a. Thereby, the button 3b provides for a certain locking action for the film strip 2 completely inserted into the opening 1a.

When such a cassette is inserted into the associated camera, the leading end 2b of the film strip 2 and the supporting tongue 3 of the pocket 1 can be pressed from one another in the above-described manner by a disconnecting element of the camera, the element engaging in depression 3a. Thereby, the projection 3b is disconnected from the recess 2b. When after the exposure the film strip 2 is inserted by hand or by film-transporting means into the interior of the cassette including its leading end 2b, the button 3b is located so accurately before the opening 1a that the leading end 2b cannot be withdrawn by itself or because of vibrations or dropping of the cassette 1 out of the opening. Such a possibility is prevented by the button 3b. The above-described construction possesses the additional advantage, compared with the construction shown in FIGS. 1–5, that when the film strip is fully inserted into the cassette after exposure, it can be recognized that the inserted film strip has been exposed and the fully inserted film strip is again prevented from unintentional withdrawal from the cassette. The button 3b in accordance with this construction has a double function, namely the securing of the leading end not only in one position, but in two different positions before and after the exposure.

The film cassette shown in FIGS. 6a and 6b is provided with a preventing means which is designed in a reverse order as compared with the previously described constructions. The projection is formed here as stamped lugs 2e arranged in the leading end 2b of the film strip 2, Whereas the recesses 3c are provided in the supporting tongue 3 of the pocket 1. The lugs 2e engage in the recesses 3c.

Figure 8:
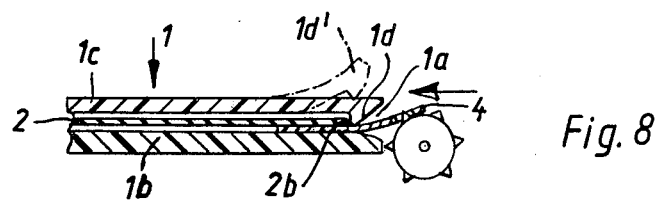
FIG. 8 is a view showing a film cassette in accordance with a further embodiment of the present invention.

The cassette shown in FIG. 8 has an arresting element provided in the opening 1a for preventing sliding out of the film strip 2. A protective paper strip 4 is provided with the same perforations as the film strip 2 and extends outwardly beyond the opening 1a. It is connected with the leading end 2b of the film strip 2, so that a film transport element 5 of the camera engages the protective paper strip 4 and transports the film strip 2 outwardly of the opening 1a. The arresting element for preventing sliding of the film strip 2 out of the opening 1a is formed as a hook-shaped lip 1d in the region of the opening 1a, the hook-shaped lip provided before the leading end 2b of the film strip. The protecting paper strip 4 extends under the hook-shaped lip 1d outwardly of the opening 1a. When the cassette is inserted into the camera, a force acts upon an inclined flank of the hook 1d so that the latter tilts to a position 1d' shown in dotted lines. Thereby, the film strip 2 is withdrawn from the opening 1a via the protective paper strip 4. After the reverse movement of the exposed film strip 2 into the cassette 1 and withdrawal of the cassette from the camera, the hook-shaped lip 1d snaps back into its arresting position shown in solid lines. The outwardly extending portion of the protective paper strip 4 can be torn off or cut off, for example by separating means provided in the camera, so that the different protective paper strip length serves as an indicator for non-exposed and exposed film.

The film cassettes shown in FIGS. 9–12 differ from the above-described cassettes in the fact that the preventing means for preventing unintentional withdrawal of the film strip 2 out of the cassette 1 is provided here at the trailing end of the pocket 1 or the film strip 2. These film cassettes are similar to the film cassette of FIG. 7, in the fact that the trailing end 2c of the film strip 2 before the exposure lies in the cassette less deeply, so that the leading end of the film strip extends outwardly beyond the opening 1a for engagement by a transporting element of the camera. After the exposure, it is inserted so deep into the cassette that the leading end of the film strip 2 no longer extends outwardly beyond the opening 1a and thereby it can be recognized that the film strip has been exposed.

Figure 10:
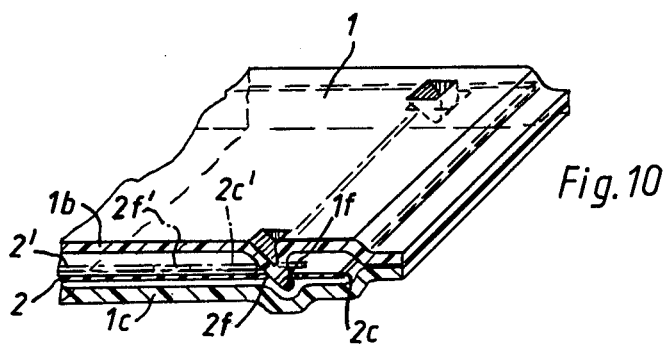
FIG. 10 is a view showing a film cassette in accordance still a further embodiment of the present invention.

The withdrawal-preventing means of the cassette shown in FIG. 10 has a cam if provided on the cassette wall 1b and extending against the film strip 2. The end 2c of the non-exposed film strip 2 (shown in dotted lines) is somewhat clamped in the cam 1f and the wall 1c of the cassette, so that the film strip 2 is retained in the cassette because of friction or clamping. This friction can be easily overcome by a film transport element of the camera. Arter the exposure, the exposed film strip 2 shown by hatching is inserted more deeply into the cassette, so that the trailing end 2c of the film strip is displaced via a narrow passage formed in the interior of the cassette behind the cam 1f between the latter and the opposite wall 1c. The trailing end 2c displaces until a recess 2f provided in the trailing end 2c and associated with the cam 1f engages with the cam 1f. Thereby the exposed film strip 2 is retained in the cassette because of the engagement between the cam 1f and the recess 2f against unintentional withdrawal.

It is advantageous when the cam 1h is formed as an arresting hook or catch with a flat inclined flank in direction of film insertion and with a steep arresting flank in direction of withdrawal. The steep arresting flank can be so inclined in the insertion direction that during engagement of the leading end 2b of the film strip 2 by a tongue extending through the opening 1a, the film strip 2 can again be withdrawn through the film opening 1a. There is also a possibility to cut off the cassette end in the dark chamber and to remove the exposed film strip 2 from the cut off cassette end for winding. These two possibilities also take place in the film cassettes designed in accordance with FIGS. 11 and 12, which will be described hereinbelow.

Figures 11A, 11B:
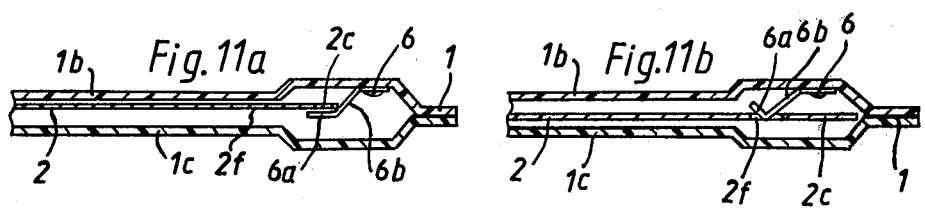
FIGS. 11a, 11b, 12a and 12b are views showing the film cassette in accordance with an additional embodiment of the present invention.

The film cassette shown in FIGS. 11a and 11b has a spring arm 6 mounted on the wall 1b of the pocket 1 and having two mutually inclined flanks 6a and 6b. The spring arm 6 is arranged so that it extends substantially from the trailing end of the pocket in the film transport direction. During film packaging, the free flank 6a is bent under prestress substantially parallel to the plane of the film strip 2, so that it forms a pocket-shaped support for the trailing end 2b of the film strip. Thereby the trailing end 2c is somewhat clamped against the wall 1b, as can be seen from FIG. 11a. After the exposure, the trailing end 2c is displaced under the action of the now inclined flank 6a, as can be seen from FIG. 11b, below the flanks 6a and 6b until the film strip 2 is completely located inside the cassette. In this position the edge of the flanks 6a and 6b engages in the respective recess of the trailing end 2c of the film strip 2.

Figure 12A:
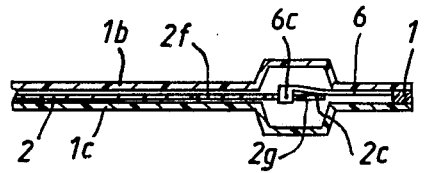
Figure 12B:
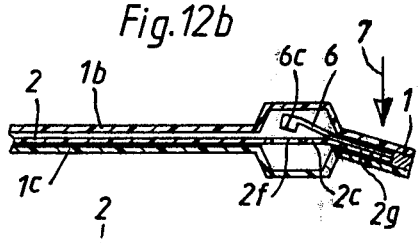

The film cassette shown in FIGS. 12a and 12b differs from that shown in FIGS. 11a and 11b in the fact that instead of the inclined flanks, the arresting hook or catch 6c is here provided. The catch 6c is associated with two recesses 2f and 2g which are formed in the trailing end 2c of the film strip and spaced from one another in the film transport direction. When the film strip is unexposed, the catch 6c engages in the recess 2g as can be seen from FIG. 12a, and when the film strip is exposed, the catch 6c engages in the recess 2f as can be seen from FIG. 12b. The spring arm 6 which carries the catch 6c is so mounted on the wall or the end of the cassette that by downward displacement of the end of the cassette in the direction of the arrow 7 by an element of the camera or a laboratory device, the catch 6c is turned out of the respective recess 2g or 2f. Thereby the film strip can be engaged at its leading end by the camera element and transported in the camera in both directions. The withdrawal of the film strip after the exposure can be performed by pliers or extractor through the opening 1a.

Figure 9A:
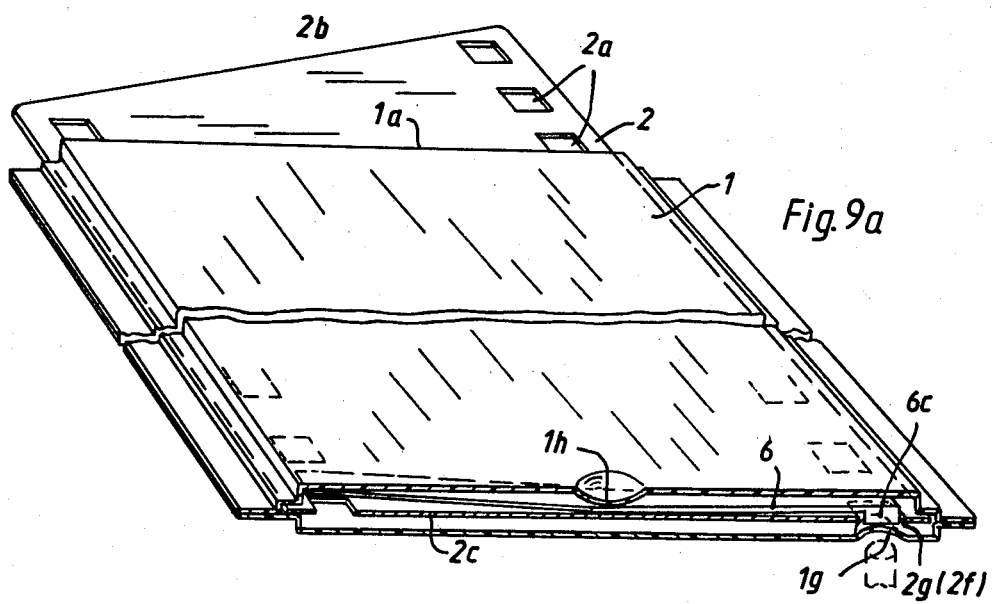
FIGS. 9a and 9b are views showing the film cassette in accordance with the present invention, wherein means for preventing unintentional withdrawal of the film strip from the cassette is provided in the region of a trailing end of the film strip.
Figure 9B:
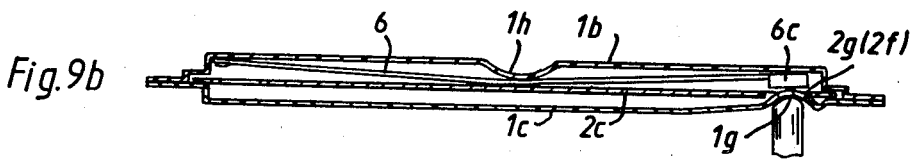

Similar means are provided in the film cassette shown in FIGS. 9a and 9b. Namely here the spring arm 6 has the catch 6c which engages in one of two recesses 2g and 2f in dependence on the position of the trailing end of the film strip. The spring arm 6 here, however, extends transverse to the film transport direction parallel to the width of the film strip. An arch section 1g is provided in the wall 1c opposite to the catch 6c. An element of the camera or laboratory device can press the catch 6 through the arch section 1g from the respective recess 2g or 2f. The arch section 1g is rounded or inclined so that it allows sliding of the edges of the recesses and thereby film transport in both direction. Advantageously, a further arch section 1h is provided in the wall 1b and extends against the spring arm 6 so as to impart a certain prestress to the spring arm 6.

Figure 13A:
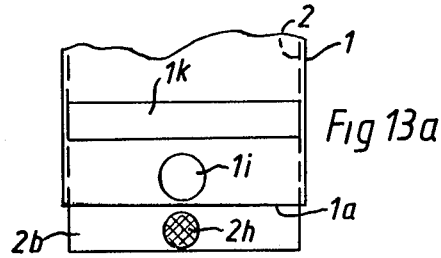
FIGS. 13a and 13b are views showing still an additional embodiment of the present invention.
Figure 13B:
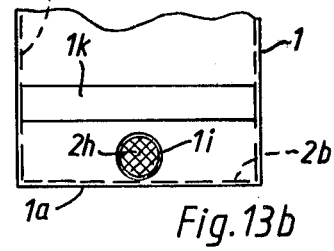

It is to be understood that the preventing means can be designed somewhat differently, which is not shown in the drawing for the sake of simplicity. Particularly, the preventing means of FIGS. 1-6 can be combined with the preventing means of FIGS. 9-12. The film cassette of FIGS. 7 and 9-12 can be provided with a further indicating arrangement to identify whether unexposed or exposed film strip is located in the cassette, as shown in FIGS. 13a and 13b. An observation window 1i is provided here in one cassette wall inside the opening 1a, and a light seal 1k is arranged behind the window. The film strip has at its leading end 2b a different surface structure 2h than the conventional film. Before the exposure, the part 2h is located outside of the cassette, and after the exposure it is located in the region of the observation window 1i, so that the different picture can be recognized through the observation window and it is clear whether the film in the cassette is exposed or not exposed. The spring arm 6 can be composed of magnetizable material so that it can be moved to and from its arresting position by a magnet provided in the camera or laboratory device.

Figure 14:
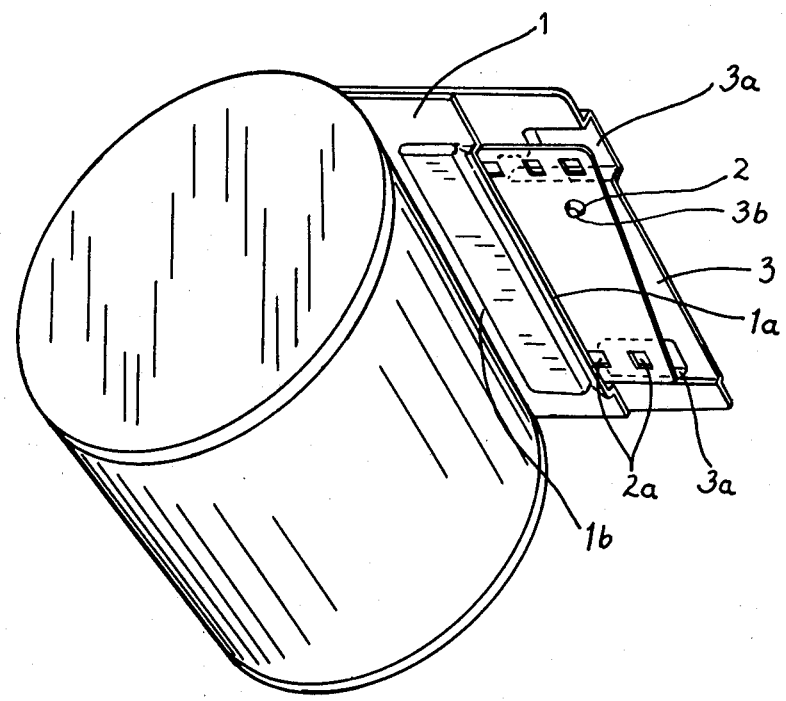
FIG. 14 is a view showing the film cassette in accordance with the present invention, which is formed as a roll.

As can be seen from FIG. 14, the above-described preventing means can be provided not only in a film cassette such as the pocket 1, but also in a film cassette formed as a roll.

It will be understood that each of the elements described above, or two or more together, may also find a useful application in other types of constructions differing from the types described above.

While the invention has been illustrated and described as embodied in a film cassette for multi-exposure film strips, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A film cassette for multi-exposure film strips having a leading end and movable in withdrawal and insertion directions, the film cassette comprising a body part having an inner compartment for a film strip, and at least one opening for passage of the film strip therethrough between an initial position before exposure and a final position after exposure of the film strip; and means for preventing unintentional withdrawal of the film strip from said body part in at least one of said positions, said preventing means being arranged between said body part and the film strip, said preventing means being formed differently in said directions, so that said preventing means prevents unintentional withdrawal of the leading end of the film strip extending outwardly of said opening of said body part before exposure, but allows deactivation of said preventing means under the action of a disconnecting element of a camera and complete insertion of the film strip into said body part, as well as reactivation of said preventing means for the completely inserted film strip.

2. A film cassette for multi-exposure film strips, comprising a body part having an inner compartment for a film strip, and at least one opening for passage of the film strip therethrough between an initial position before exposure and a final position after exposure of the film strip; means for preventing unintentional withdrawal of the film strip from said body part in at least one of said positions, said preventing means being arranged between said body part and the film strip, said body part and the film strip forming two members, said preventing means including a recess provided in one of said members and a projection provided in one of said members and a projection provided on the other of said members and engageable in said recess, the film strip having a leading end extending outwardly beyond said body part and provided with said recess, said body part having a pivotally connected supporting tongue extending outwardly beyond said opening and provided with said projection, said opening of said body part being formed as a slit having a predetermined height, said projection being springy and arranged adjacent to said opening with a height which is at least equal to the height of said slot; and means for allowing access of a disconnecting element of a camera to said preventing means so as to disengage said projection from said recess, said allowing means including a corrugation provided on said supporting tongue and extending to its free end.

3. A film cassette for multi-exposure film strips, comprising a body part having an inner compartment for a film strip, and at least one opening for passage of the film strip therethrough between an initial position before exposure and a final position after exposure of the film strip; and means for preventing unintentional withdrawal of the film strip from said body part in at least one of said positions, said preventing means being arranged between said body part and the film strip, the film strip having a trailing end, said preventing means including a projection provided in the interior of said body portion in the region of the trailing end of the film strip, and a recess in which said projection is engageble, said projection being provided at one side of the film strip, said body part having a wall located at opposite side of the film strip and provided with an elastic arch section extending toward said projection and arranged so that a disconnecting element of a camera can press against said projection via said arch section, so as to disengage said projection from said recess.

4. A film cassette as defined in claim 3, wherein the film strip moves in a transport direction in two opposite senses, said arch section of said wall of said body portion being shaped so that it engages in said further recess during movement in both opposite senses.

5. A film cassette as define in claim 4 wherein said arch section of said wall of said body part is rounded.

6. A film cassette as defined in claim 4, wherein said arch section of said wall of said body part is bevelled.

7. A film cassette as defined in claim 3, wherein said body part has a further wall located at said one side of the film strip and provided with a further elastic arch section for pressing said further projection so that the latter engages into said further recess.

8. A film cassette for multi-exposure film strips with a trailing end and movable in a transport direction in a predetermined plane, the film cassette comprising a body part having an inner compartment for a film strip, and at least one opening for passage of the film strip therethrough between an initial position before exposure and a final position after exposure of the film strip; and means for preventing unintentional withdrawal of the film strip from said body part in at least one of said positions, said preventing means being arranged between said body part and the film strip, said preventing means including a projection provided in the interior of said body portion in the region of the trailing end of the film strip, and a recess in which said projection is engageable, said body part having a trailing end and a spring arm extending transverse to the transport direction of the film strip and carrying said projection, said spring arm having two mutually inclined flanks and extending from said trailing end of said body portion in said transport direction, said flanks of said spring arm including a first flank which is prestressed by the trailing end of the film strip so that said flat flank extends substantially parallel to the plane of the film strip and forms a pocket-shaped support for the trailing end thereof before exposure, said first flank of said spring arm being released after return of the film strip so that both flanks of said spring arm engage in said further recess of the trailing end of the film strip.

9. A film cassette for multi-exposure film strips having a trailing end and movable in a transport direction in a predetermined plane, the film cassette comprising a body part having an inner compartment for a film strip, and at least one opening for passage of the film strip therethrough between an initial position before exposure and a final position after exposure of the film strip; and means for preventing unintentional withdrawal of the film strip from said body part in at least one of said positions, said preventing means being arranged between said body part and the film strip, said preventing means including a projection provided in the interior of said body portion in the region of the trailing end of the film strip, and a recess in which said further projection is engageable, said body part having a trailing end and a spring arm extending transverse to the transport direction of the film strip and carrying said projection, said spring arm being mounted on said trailing end of said body part and extending in said transport direction, said spring arm having a catch engageable in said further recess of the film strip and forming said further projection, said trailing end of said body part together with said spring arm being inclined to said plane so that said catch can pivot from said further recess.

10. A film cassette for multi-exposure film strips, comprising a body part having an inner compartment for a film strip, and at least one opening for passage of the film strip therethrough between an initial position before exposure and a final position after exposure of the film strip; means for preventing unintentional withdrawal of the film strip from said body part in at least one of said positions, said preventing means being arranged between said body part and the film strip, said body part and the film strip forming two members, said preventing means including a recess provided in one of said members and a projection provided on the other of said members and engageable in said recess, the film strip having a leading end extending outwardly beyond said body part and provided with said recess, said body part having a pivotally connected supporting tongue extending outwardly beyond said opening and provided with said projection; and means for allowing access of a disconnecting element of a camera to said preventing means so as to disengage said projection from said recess.

11. A film cassette as defined in claim 10, wherein said preventing means is arranged so as to prevent unintentional withdrawal of the film strip from said body part in each of said positions.

12. A film cassette as defined in claim 10, wherein said allowing means includes an additional recess provided in said leading end of the film strip.

13. A film cassette for multi-exposure film strips, comprising a body part having an inner compartment for a film strip, and at least one opening for passage of the film strip therethrough between an initial position before exposure and a final position after exposure of the film strip; and means for preventing unintentional withdrawal of the film strip from said body part in each of said positions, said preventing means being arranged releasable by a disconnecting element of a camera and located between said body part and the film strip inside said body part.

14. A film cassette as defined in claim 13, wherein said body part has a flat elongated pocket of opaque material, said opening extending normal to the elongation of said pocket, sadi preventing means being arranged between said pocket and the film strip.

15. A film cassette as defined in claim 13, wherein said body part and the film strip form two members, said preventing means including a recess provided in one of said members and a projection provided on the other of said members and engageable in said recess.

16. A film cassette as defined in claim 15, wherein said recess is provided in said body part, said projection including at least one lug engageable into said recess of said body part.

17. A film cassette as defined in claim 16, wherein the film strip has a leading end extending outwardly of said body part and provided with said projection, said body part having a supporting tongue extending outwardly beyond said opening and provided with said recess.

18. A film cassette as defined in claim 15, wherein the film strip has a leading end extending outwardly beyond said body part and provided with said recess, said body part having a supporting tongue extending outwardly beyond said opening and provided with said projection.

19. A film cassette as defined in claim 18, wherein said opening of said body part is formed as a slit having a predetermined height, said projection being springy and arranged adjacent to said opening with a height which is at least equal to the height of said slit.

20. A film cassette as defined in claim 15, wherein said projection is formed as a pushing type button.

21. A film cassette as defined in claim 20, wherein said button has one location with a greatest width, said recess having an inner dimension which is smaller than the greatest width of said button.

22. A film cassette as defined in claim 15, wherein one of said members has a portion which is offset from a respective portion of the other of said members so as to allow a disconnecting element of a camera to disengage said projection from said recess.

23. A film cassette as defined in claim 13; and further comprising means for indicating location of the exposed film strip or the non-exposed film strip in said body part.

24. A film cassette as defined in claim 23, wherein the film strip has a leading end extending outwardly beyond said opening of said body part and a remaining portion located inside said body part, the leading end and the remaining portion of the film strip having different surface structures, said indicating means including an observation window provided in said body part and allowing to observe the respective surface structure.

25. A film cassette as defined in claim 24; and further comprising light-sealing means provided in said body part inwardly of said opening, said observation window being formed outwardly of said sealing means.

26. A film cassette as defined in claim 13, wherein said film strip has a leading end connected with a protective strip extending outwardy beyond said opening of said body part, said preventing means including a lip provided on said body part adjacent to said opening and formed as an arresting hook engageable with the leading end of the film strip, said hook having an outer surface which is inclined to the interior of said body part so that said hook can be withdrawn by a disconnecting element of a camera from the path of the leading end of the film strip.

27. A film cassette as defined in claim 13, wherein the film strip has a trailing end, said preventing means including a further projection provided in the interior of said body portion in the region of the trailing end of the film strip, and a further recess in which said further projection is engageable.

28. A film cassette as defined in claim 27, wherein said further recess is provided in the film strip adjacent to the trailing end thereof and is arranged so that said further projection can engage in said further recess.

29. A film cassette as defined in claim 27, wherein the film strip moves in a transport direction, said body part having a spring arm extending transverse to the transport direction of the film strip and carrying said further projection.

30. A film cassette as defined in claim 29, wherein said spring arm is a magnetizable arm.

31. A film cassette as defined in claim 29, wherein said body part has a trailing end, said spring arm having two manually inclined flanks and extending from said trailing end of said body portion in said transport direction.

32. A film cassette as defined in claim 29 wherein said body part has a trailing end, said spring arm being mounted on said trailing end of said body part and extending in said transport direction, said spring arm having a catch engageable in said further recess of the film strip and forming said further projection.

33. A film cassette as defined in claim 27, wherein the film strip moves in transport and return directions, and further projection being formed as a catch having a steep flank extending against the transport direction and a flat inclined flank extending in the return direction.

34. A film cassette as defined in claim 33, wherein the trailing end of the film strip before exposure is located before said flat inclined flank, as considered in direction from said opening outwardly, the trailing end of the film strip after exposure being returnable over said flat inclined flank to the region after said steep flank, and said further recess being arranged in the trailing end of the film strip for engaging by said further projection.

35. A film cassette as defined in claim 13, wherein the film strip has a trailing end, said preventing means including two additional recesses provided in the film strip and spaced from one another in direction of elongation thereof, one of said recesses being located closer to the trailing end of the film strip, whereas the other of said recesses being located further from the same, said preventing means further including an additional projection provided in said body portion and arranged so that said additional projection engages said one additional recess in said initial position and engages said other additional recess in said final position.

* * * * *